United States Patent
Weber et al.

(10) Patent No.: US 12,297,988 B2
(45) Date of Patent: *May 13, 2025

(54) VEHICLE LIGHT ASSEMBLY WITH LIGHT BAR AND ROTATABLE PROJECTOR

(71) Applicant: NISSAN NORTH AMERICA, INC., Franklin, TN (US)

(72) Inventors: William J. Weber, Brighton, MI (US); Dale Butterworth, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,640

(22) Filed: Mar. 8, 2024

(65) Prior Publication Data

US 2024/0210018 A1  Jun. 27, 2024

Related U.S. Application Data

(63) Continuation of application No. 17/958,220, filed on Sep. 30, 2022, now Pat. No. 12,000,573.

(51) Int. Cl.
| | |
|---|---|
| *F21V 21/14* | (2006.01) |
| *B60Q 1/26* | (2006.01) |
| *B60Q 1/32* | (2006.01) |

(52) U.S. Cl.
CPC ............ *F21V 21/14* (2013.01); *B60Q 1/2607* (2013.01); *B60Q 1/32* (2013.01); *B60Q 2400/50* (2013.01)

(58) Field of Classification Search
CPC .......... B60Q 1/32; B60Q 1/323; B60Q 1/324; B60Q 1/325; F21W 2102/40; F21W 21/14; F21W 21/30
See application file for complete search history.

(56) References Cited

U.S. PATENT DOCUMENTS

| | | | |
|---|---|---|---|
| 5,432,643 A | 7/1995 | Huang | |
| 8,915,601 B2 | 12/2014 | Foote et al. | |
| 9,321,395 B2 | 4/2016 | Ammar et al. | |
| 10,293,745 B2 | 5/2019 | Vargas Rivero et al. | |
| 11,117,510 B2 | 9/2021 | Weber et al. | |
| 2019/0270403 A1 | 9/2019 | Sobecki et al. | |
| 2021/0370821 A1 | 12/2021 | Weber et al. | |
| 2022/0348134 A1 | 11/2022 | Beernaert et al. | |

FOREIGN PATENT DOCUMENTS

WO   20050108165 A1   11/2005

*Primary Examiner* — Robert J May

(74) *Attorney, Agent, or Firm* — Global IP Counselors, LLP

(57) ABSTRACT

A light assembly for a vehicle includes a light bar, a projector and an end cap. The light bar is configured to be connected to a vehicle. An end cap is connected to an end of the light bar. The projector is rotatably connected to the light bar. The projector is configured to be rotatable relative to the end cap. The projector is configured to be axially movable relative to the end cap between a first position and a second position. Rotation of the projector relative to the end cap is prevented when the projector is in the first position. The projector is rotatable relative to the end cap when the projector is in the second position.

19 Claims, 16 Drawing Sheets

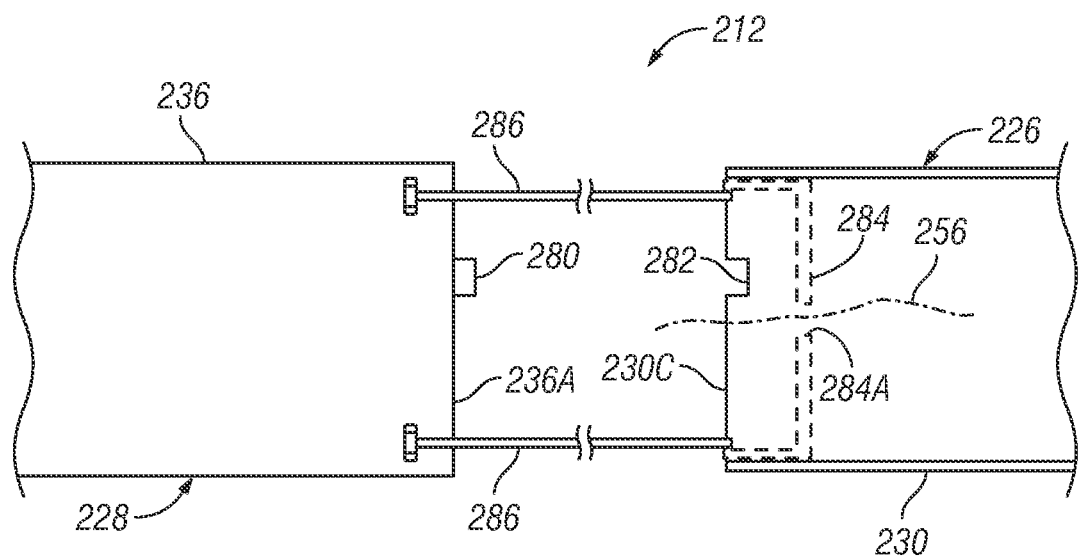
FIG. 16
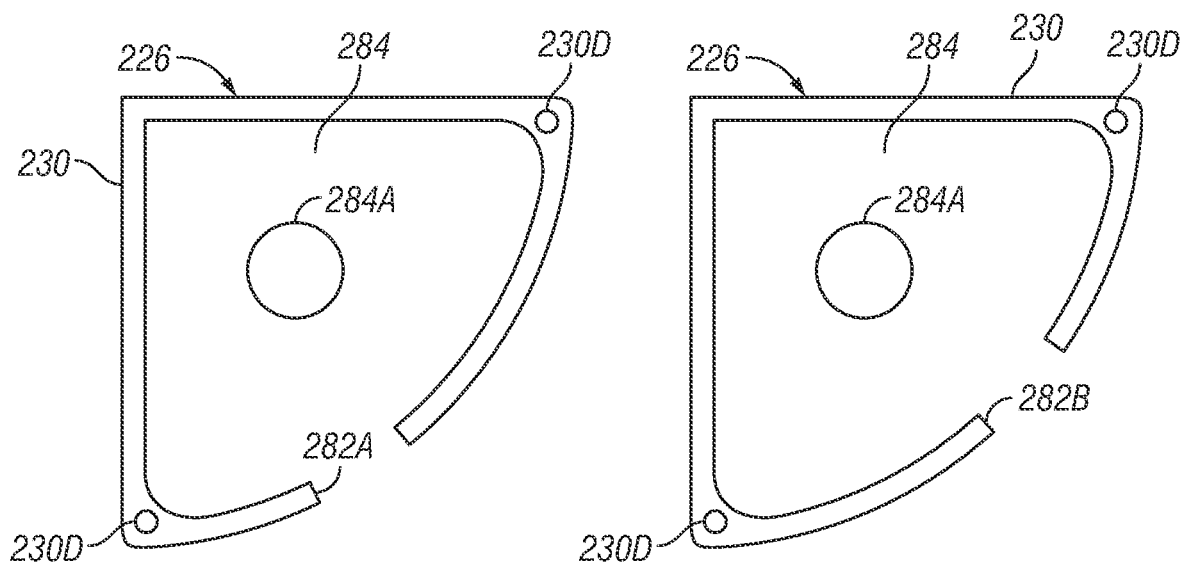
FIG. 17  FIG. 18

VEHICLE LIGHT ASSEMBLY WITH LIGHT BAR AND ROTATABLE PROJECTOR

CROSS-REFERENCE TO RELATED APPLICATIONS

This application is a continuation application of U.S. application Ser. No. 17/958,220, filed Sep. 30, 2022. The entire disclosure of U.S. application Ser. No. 17/958,220, filed Sep. 30, 2022, is hereby incorporated herein by reference.

BACKGROUND

Technical Field

The present disclosure generally relates to a vehicle light assembly. More specifically, the present disclosure relates to a vehicle light assembly in which a projector is rotatable relative to an end cap of a light bar.

Background Information

A light assembly for a vehicle illuminates an external area in the vicinity of the vehicle. The light assembly includes a projector connected to an end cap of a light bar. An orientation of the projector relative to the end cap changes for each different vehicle make and model. A different light assembly is manufactured for each different vehicle make and model to control the orientation of the projector relative to the end cap of the light bar.

SUMMARY

In view of the state of the known technology, one aspect of the present invention is to provide a light assembly for a vehicle. The light assembly includes a light bar, a projector and an end cap. The light bar is configured to be connected to a vehicle. An end cap is connected to an end of the light bar. The projector is rotatably connected to the light bar. The projector is configured to be rotatable relative to the end cap. The projector is configured to be axially movable relative to the end cap between a first position and a second position. Rotation of the projector relative to the end cap is prevented when the projector is in the first position. The projector is rotatable relative to the end cap when the projector is in the second position.

Another aspect of the present invention is to provide a light assembly for a vehicle. The light assembly includes a light bar, an end cap, and a projector. The light bar is configured to be connected to a vehicle. The end cap is connected to an end of the light bar. The projector is rotatably connected to the end cap. The projector is rotatable relative to the end cap. A wiring opening is disposed in the end cap. An elongated slot is disposed in the projector. The elongated slot is aligned with the wiring opening to pass electrical wiring from the light bar through the end cap to the projector. The elongated slot is configured to accommodate the electrical wiring during rotational movement of the projector relative to the end cap.

Also other objects, features, aspects and advantages of the disclosed vehicle light assembly will become apparent to those skilled in the art from the following detailed description, which, taken in conjunction with the annexed drawings, discloses exemplary embodiments of the vehicle light assembly.

BRIEF DESCRIPTION OF THE DRAWINGS

Referring now to the attached drawings which form a part of this original disclosure:

FIG. 16 is a top plan view of a projector disengaged from an end cap in accordance with another exemplary embodiment;

FIG. 17 is a front elevational view of the end cap of FIG. 16 in which a notch is disposed in a first position in the end cap; and FIG. 18 is a front elevational view of an end cap of FIG. 16 in which a notch is disposed in a second position in the end cap.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
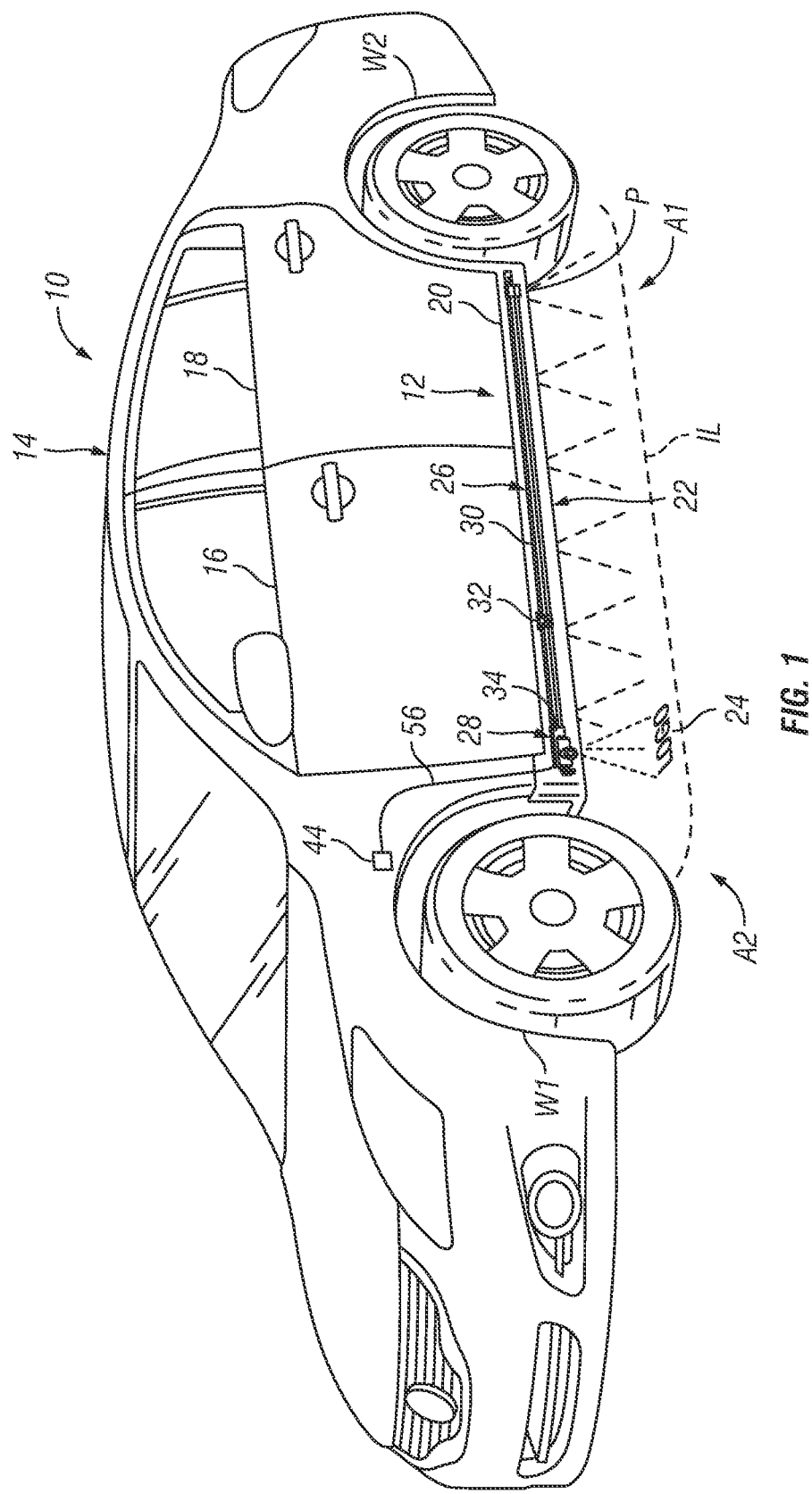
FIG. 1 is a perspective view of a vehicle equipped with a vehicle light assembly in accordance with an exemplary embodiment.

Referring now to FIG. 1, a vehicle 10 equipped with a light assembly 12 is illustrated according to an exemplary embodiment. The vehicle 10 includes a vehicle body 14, a front door 16 (illustrated as a driver side), a rear door 18 (illustrated as the driver side), and a rocker panel 20. In the illustrated embodiment, the rocker panel 20, which includes a rocker trim panel, is considered a component of the vehicle body 14 that at least partially defines an underbody 22 of the vehicle 10. Although the light assembly 12 is illustrated as being disposed on the driver side of the vehicle 10, it will be apparent to those skilled in the vehicle field from this disclosure that the rocker panel 20 and the vehicle 10 can include an additional rocker panel 20 (not shown) extending along a passenger side, which can be similarly equipped with components of the light assembly 12 of the illustrated embodiment.

The underbody 22 defines an outer perimeter P of the vehicle 10. The light assembly 12 draws electrical power from an electrical system of the vehicle 10.

The light assembly 12 illuminates an illuminated area IL external of the vehicle 10. The illuminated area IL is preferably located beneath the underbody 22 and also in the vicinity of the outer perimeter P of the vehicle 10. The illuminated area IL can extend the length of a side of the vehicle 10 and can encompass the area located directly beneath the underbody 22, the area located inboard of the perimeter P and the area located outboard of the perimeter P. Therefore, the illuminated area IL can include the ground that is located beneath the underbody 22 and in the vicinity of the outer perimeter P of the vehicle 10. While the illuminated area IL is illustrated as being projected near the driver side of the vehicle 10, it will be apparent to those skilled in the vehicle field that the light assembly 12 can be implemented with the passenger side to illuminate the ground in the vicinity of the passenger side of the vehicle 10. It will be further apparent to those skilled in the vehicle field from this disclosure that while the light assembly 12 is illustrated as illuminating the ground in the vicinity of the driver side doors, it will be apparent to those skilled in the vehicle field from this disclosure that the light assembly 12 can illuminate different external areas that are in the vicinity of the vehicle 10 as needed and/or desired.

The light assembly 12 of the exemplary embodiment can be considered an underglow light assembly or ground effects that is attached to the underbody 22 or beneath the chassis of the vehicle 10. The light assembly 12 is preferably connected to the vehicle underbody 22 and disposed inboard of the rocker panel 20. The light assembly 12 can be disposed in any suitable location of the vehicle 10. The light assembly 12 projects light towards the illuminated area IL. The light assembly 12 is oriented and/or constructed to illuminate the illuminated area IL either alone or in combination with the exterior lights (e.g., taillights or parking lights) of the vehicle 10. It will be apparent to those skilled in the vehicle field from this disclosure that the light assembly 12 can be implemented to illuminate the illuminated area IL by itself or in combination with other exterior lights of the vehicle 10.

The rocker panel 20 is a rigid panel preferably made of a durable material, such as stamped steel. The rocker panel 20 extends longitudinally along the front and rear doors 16 and 18 and is disposed below the front and rear doors 16 and 18. The rocker panel 20 extends between a front wheel well W1 and a rear wheel well W2 along the bottom sides of the vehicle 10. The rocker panel 20 forms the juncture of the underbody 22 with the front and rear doors 16 and 18 and at least partially defines the outer perimeter P of the vehicle 10. It will be apparent to those skilled in the vehicle field that the vehicle 10 additionally includes a passenger side rocker panel (not shown) that also at least partially defines the outer perimeter P of the vehicle 10. The rocker panel trim is a rigid piece of plastic or metal trim that is placed over the rocker panel 20. The rocker panel trim is fixedly attached to the rocker panel 20 by any suitable fastening means to conceal or cover all or a portion of the rocker panel 20.

The light assembly 12 is disposed on one or both sides of the vehicle 10 as needed and/or desired. The light assembly 12 operates to illuminate the illuminated area IL that is the vicinity of the rocker panel 20. The light assembly 14 of the exemplary embodiment is mounted at the underbody 22 of the vehicle 10 for illuminating the illuminated area IL in the vicinity of the vehicle 10.

Figure 2:
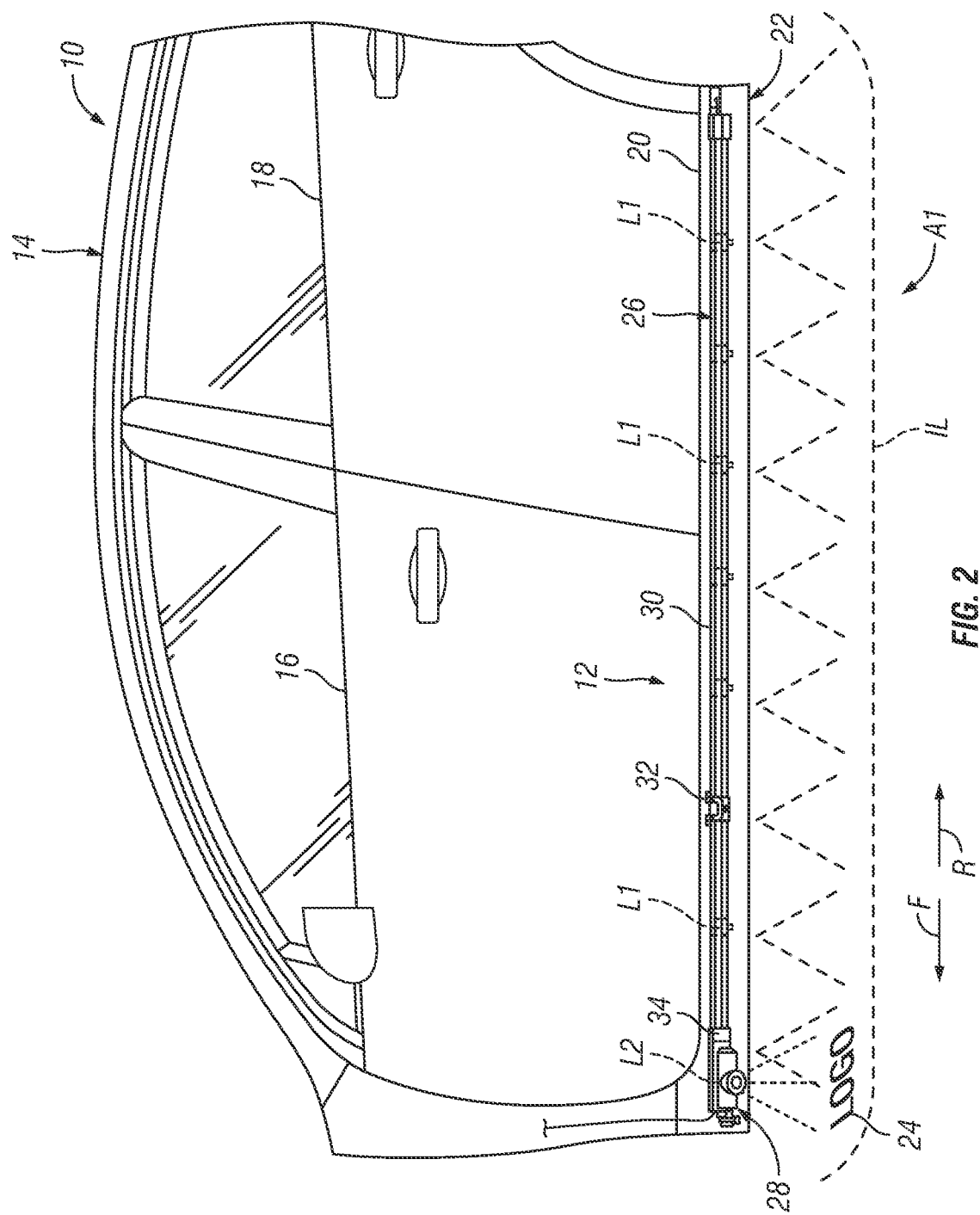
FIG. 2 is a side elevational view of the vehicle light assembly of FIG. 1.
Figure 3:
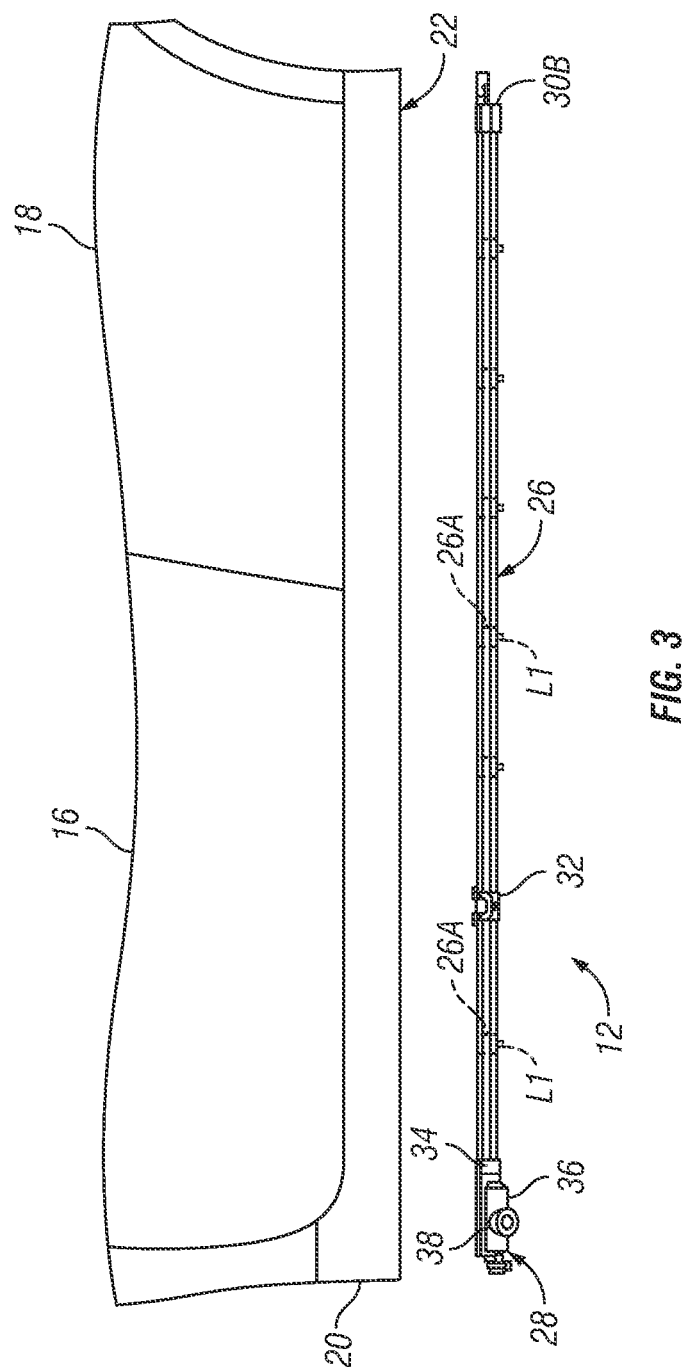
FIG. 3 is an exploded side elevational view of the vehicle of FIG. 1 prior to installation of the vehicle light assembly.

Referring to FIGS. 2 and 3, the light assembly 12 has a light bar 26 and an image projector 28. The light bar 26 includes a fixed structure 30 and a plurality of light sources L1 that are long-life LEDs disposed on the fixed structure 30 via base members 26A. The light sources L1 are preferably shielded in the base members 26A by rubber isolators (not shown) configured to reduce vibrations and improve component life. Therefore, the light bar 26 includes at least one light source L1 that is preferably an LED. The light bar 26 preferably includes a plurality of lights that are LEDs. The light sources L1 can be surface-mounted LEDs configured to emit light with any of a variety of colors, color temperatures, or other properties.

The light bar 26 is configured to illuminate a first external area A1 that is in the vicinity of the vehicle 10, as shown in FIGS. 1 and 2. The first external area A1 is part of the illuminated area IL. The fixed structure 30 of the light bar 26 is preferably configured to be assembled to the rocker panel 20. Alternatively, the fixed structure 30 is configured to be assembled to a suitable component of the vehicle body 14. The fixed structure 30 is preferably an elongated member extending in a longitudinal direction of the vehicle 10. The light sources L1 are distributed along a longitudinal length of the fixed structure 30. The light sources L1 are fixed to the fixed structure 30 and are configured to illuminate the first external area A1 that is in the vicinity of the vehicle 10. The fixed structure 30 is connected to the rocker panel 20 by any suitable means, such as by adhesive, tape, fastener, clip, clamp, or by snap-fit connection. In the illustrated embodiment, the fixed structure 30 is fastened to the rocker panel 20 by a clamp 32. The fixed structure is made of any suitable material, such as extruded aluminum.

The fixed structure 30 can also be configured to function as an auxiliary mounting component for the light assembly 12. For example, the fixed structure 30 can emit and/or distribute light produced by the light sources L1 of the light assembly 12. The fixed structure 30 can also include features for effecting a light distribution of the light assembly 12. For example, the fixed structure 30 can be configured to distribute the light produced by the light sources L1 and projected towards the first external area A1. For example, the fixed structure 30 can include one or more angled facet(s) that can distribute light produced by the light sources L1 at different desired angles. Additionally, the fixed structure 30 can include reflective material to deflect light across the underbody 22 and around the outer perimeter P of the vehicle. In the illustrated embodiment, while the light bar 26 is illustrated as including five light sources L1 distributed along the fixed structure 30, it will be apparent to those skilled in the vehicle field from this disclosure that any suitable number and spacing of the light sources L1 of the light assembly 12 can be used.

The light sources L1 are connected to the fixed structure 30, and the image projector 28 is connected to an end of fixed structure 30, as shown in FIGS. 1-3. The image projector 28 is fixed to the fixed structure 30 and is configured to project an image 24 onto a second external area A2. In the exemplary embodiment, the image projector 28 is a logo projector that projects a logo or emblem (e.g., the projected image) 24 of the vehicle 10. However, it will be apparent to those in the vehicle field from this disclosure that the image projector 28 can project other types of images (e.g., the date or time information) and/or messages (e.g., "welcome").

The image projector 28 is configured to project an image in the second external area A2 that is in the vicinity of the first external area A1, as shown in FIGS. 1 and 2. The first and second external areas A1 and A2 are adjacent to each other. Additionally, the first and second external areas A1 and A2 can overlap with one another. In other words, the image projector 28 can project the image onto an area that is illuminated by the light bar 26. The second external area A2 is part of the illuminated area IL. The light sources L1 of the light bar 26 and the image projector 28 are configured to illuminate the first and second external areas A1 and A2 in concert. The light bar 26 and the image projector 28 will be discussed in further detail below.

The image projector 28 is fixed to the light bar 26, as shown in FIGS. 1-5 and 9-12. The light bar 26 includes an end cap 34 that is connected to the fixing structure 30 at a longitudinal end 30A thereof. The image projector 28 is fixed to the end cap 34 connected to the longitudinal end 30A of the fixed structure 30 by conventional means, such as by a fastener 48. The fastener 48 is preferably a bolt connecting the image projector 28 to the end cap 34 of the light bar 26. As shown, the end cap 34 is connected to a forward longitudinal end of the fixed structure 30 of the light bar 26. The end cap 34 is made of any suitable material, such as cast aluminum.

The image projector 28 is connected to the end cap 34 disposed at the forward end of the fixed structure 30 of the light bar 26. As shown in FIGS. 1-3, the image projector 28 and the end cap 34 are preferably disposed below the driver side door 16. It will be apparent to those skilled in the vehicle field from this disclosure that the image projector 28 can be alternatively, or additionally, fixed to a rearward end 30B of the light bar 26. It will also be apparent to those skilled in the vehicle field from this disclosure that the length and location of the light bar 26 can vary such that the location of the image projector 28 will also vary with respect to the underbody 22.

Figure 4:
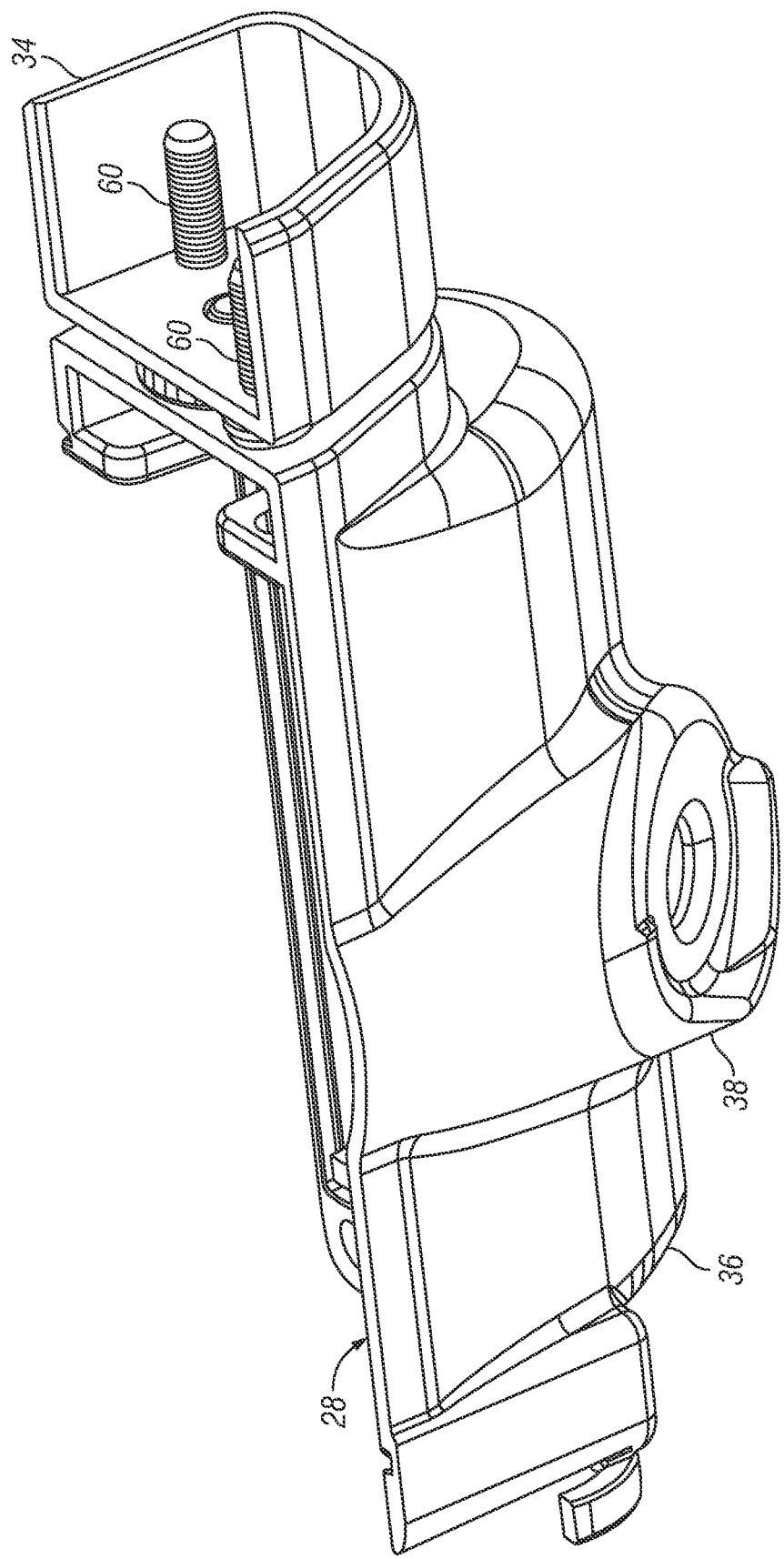
FIG. 4 is a perspective view of a projector connected to an end cap of the vehicle light assembly of FIG. 1.
Figure 11:
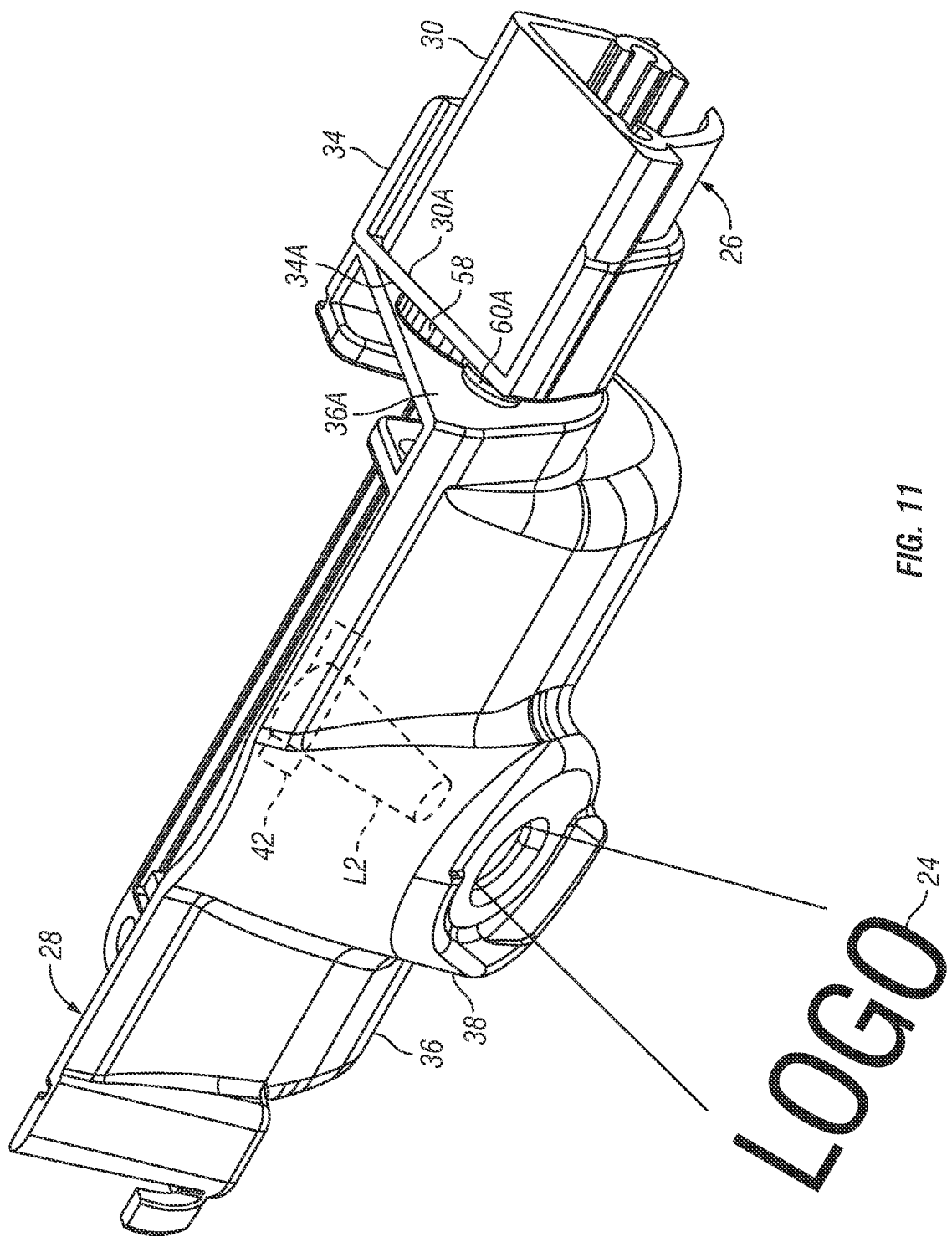
FIG. 11 is a perspective view of the projector connected to the end cap of FIG. 4 with the projector rotated relative to the end cap.
Figure 12:
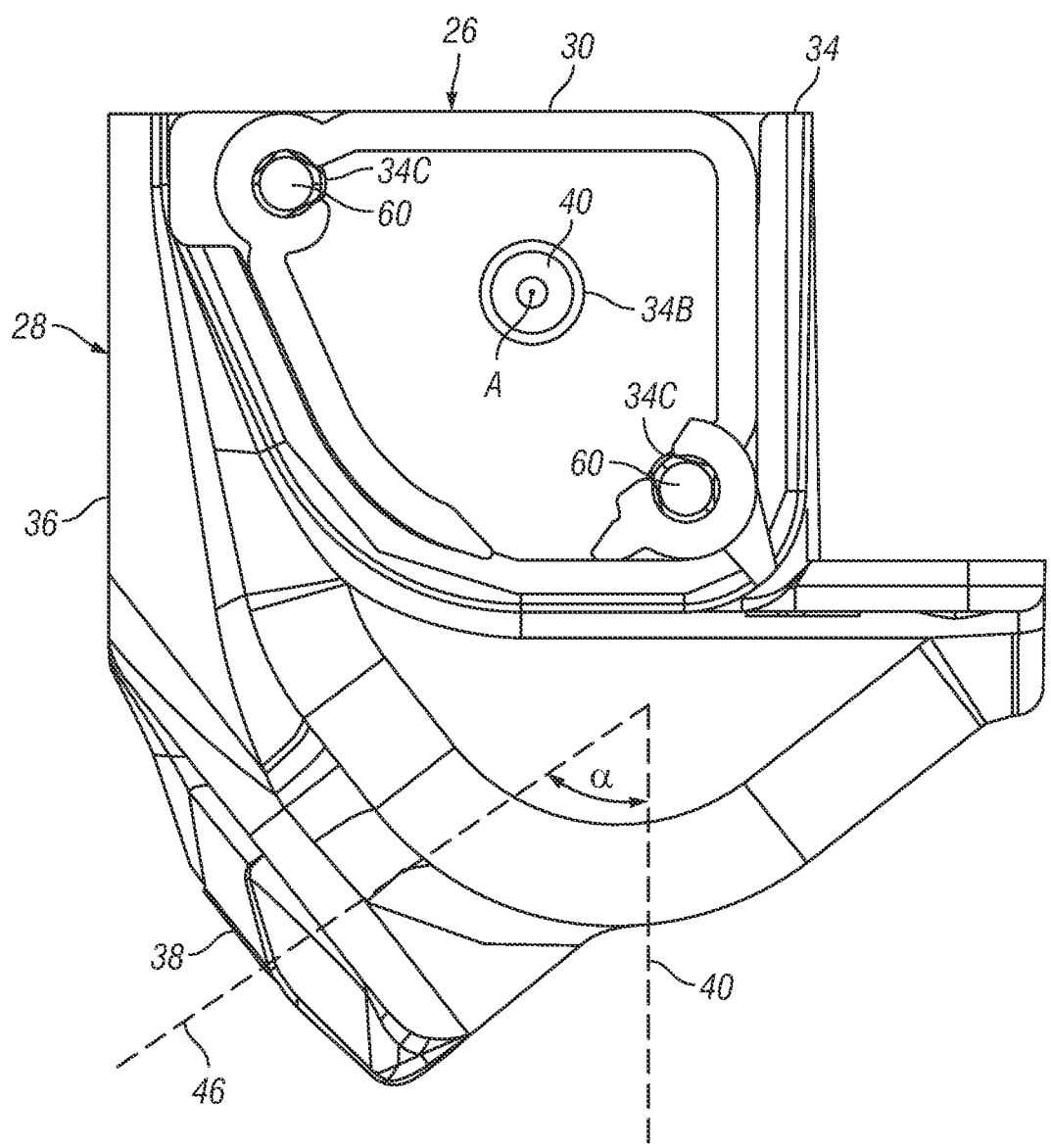
FIG. 12 is a side elevational view of the projector connected to the end cap of FIG. 4.

The image projector 28 includes a housing 36 having an emitting portion 38 projecting at an angle α with respect to a vertical line 40 perpendicular to the ground, as shown in FIGS. 4, 11 and 12. The housing 36 houses a light source L2 that illuminates the image projected by the image projector 28. The housing 36 is made of any suitable material, such as cast aluminum.

In the exemplary embodiment, the light source L2 of the image projector 28 is preferably an LED. The housing 36 of the image projector 28 further houses a circuit board 42, as shown in FIG. 11, that mechanically supports and electrically connects the light source L2 to an electric control module 44 (FIG. 1) of the lighting system of the vehicle 10. The circuit board 42 can be conventional and include one or more layers of copper laminated onto a non-conductive substrate. The circuit board 42 is electrically connected to the electric control module (ECU) 44 of the lighting system, as will be further explained below. The circuit board 42 is electrically connected to the projector light source L2 of the image projector 28 to regulate electric current transferred from the electric control module 44 to the projector light source L2 of the image projector 28. The projector light source L2 of the image projector 28 preferably emits at least one beam with a wavelength between 15 and 1100 nanometers of visible light.

The image projector 28 includes a lens stack (not shown) that is downstream of the projector light source L2 in a direction in which light is emitted by the light source L2. The lens stack is a set of optics that are transparent plates with a nanometric surface treatment, such as etchings. The etchings provide a diffuse reflection on one side of the plates but not on the other to facilitate the passing of consistent light beams in a particular order. The image projector 28 generates the projected image as projected laser light. The image projector 28 further includes a protective lens (not shown) downstream of the lens stack. The protective lens can include reflective material disposed at a portion of the outer surface of the lens to deflect light that would otherwise be wasted across the underbody 22 of the vehicle 10. The image that is projected can be imprinted onto the surface protective lens. For example, the logo 24 (FIGS. 1, 2 and 11) that is to be projected can be painted or imprinted onto the protective lens.

In the illustrated embodiment, the mounting angle α is the angle between the emitting portion 38 and the vertical line 40 perpendicular to the ground. More specifically, the mounting angle α of the image projector 28 refers to the angle formed between a line 46 bisecting the emitting portion 38 of the image projector 28 and the vertical line 40 perpendicular to the ground, as shown in FIG. 12. The line 46 defines the direction of the light beam projected by the projector light source L2. Rotation of the projector 28 changes the mounting angle α at which the light source L2 emits light from the projector 28. The mounting angle α controls the position and size of the image 24 displayed on the ground. As shown in FIG. 2, a first mounting angle projects the image 24 having a first size. The projector 28 is rotated relative to the end cap 34, as shown in FIG. 11, to display the image 24 having a second size larger than the first size. As shown in FIG. 12, clockwise rotation of the image projector 28 relative to the end cap 34 increases the mounting angle α, which enlarges the displayed image and moves the displayed image further outboard relative to the vehicle.

Referring to FIG. 1, the electric control module or electric control unit 44 electrically controls the components of the light assembly 12. Specifically, the electric control module 44 electrically controls the light bar light sources L1 of the light bar 26 and the projector light source L2 of the image projector 28. As illustrated, the electric control module 44 is part of the light assembly 12. The electric control module 44 preferably includes a microcomputer that includes one or more processor(s) and one or more storage device(s) (i.e., a computer memory device). The memory is any computer storage device or any computer readable medium with the sole exception of a transitory, propagating signal. For example, the memory can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM (Random Access Memory) device, a hard disk, a flash drive, etc. The storage device is configured to store settings, programs, data, calculations and/or results of the processor(s).

Figure 9:
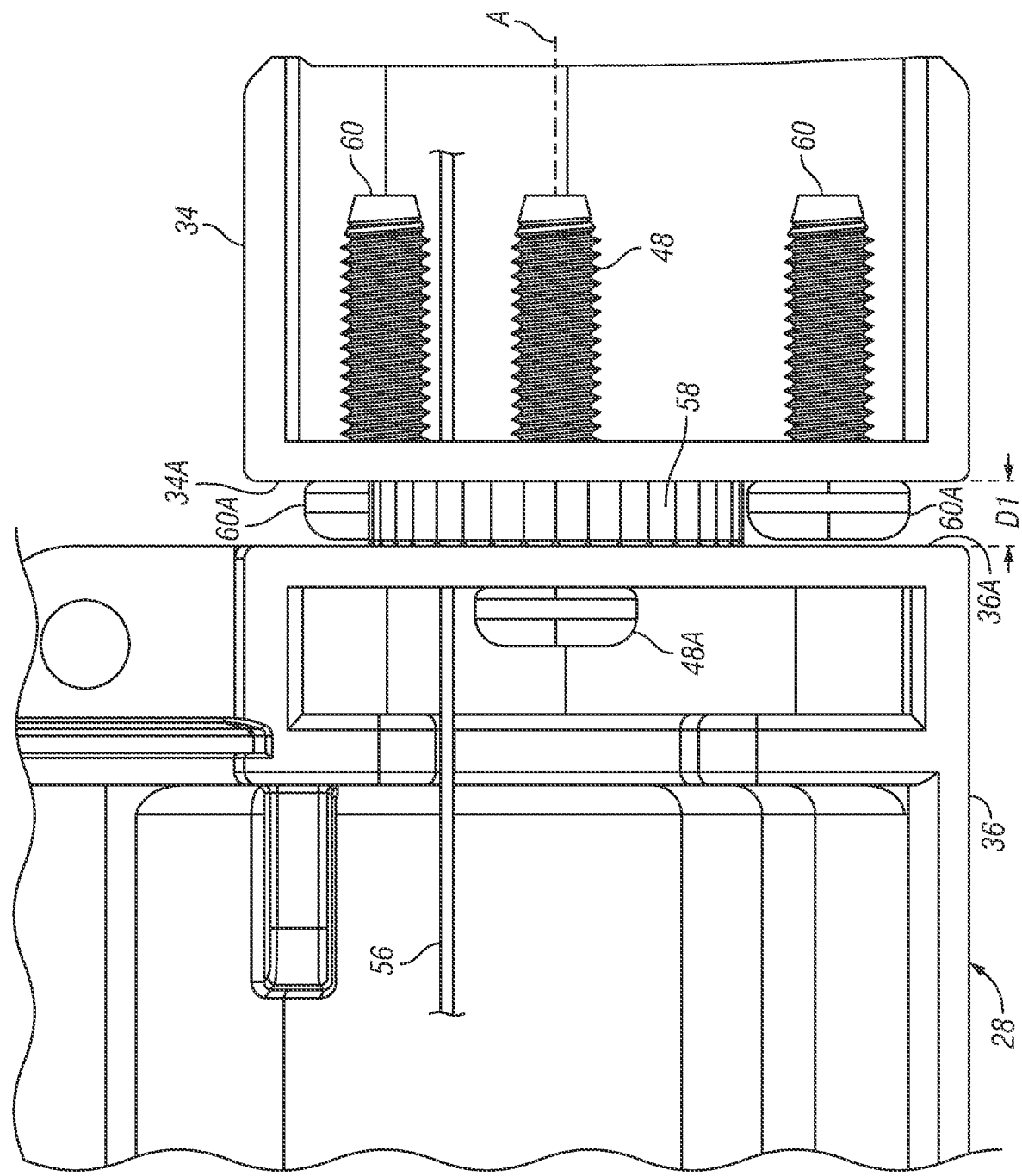
FIG. 9 is a top plan view of the projector connected to the end cap of FIG. 4 with the projector disposed in a first position.

The electric control module 44 is electrically connected to the light bar 26 and the image projector 28. The electric control module 44 provides electrical power to both the light bar 26 and the image projector 28. The electric control module 44 is electrically connected to and electrically operates the light sources L1 and L2 of the light bar 26 and the image projector 28. The electric control module 44 is electrically connected to the light sources L1 and L2 of the light bar 26 and the image projector 28 and to the image projector circuit board 42 by electrical wiring 56, as shown in FIGS. 1 and 9. The light bar light sources L2 of the light bar 26 and the projector light source L2 of the image projector 28 are configured to activate at substantially the same time to illuminate the illuminated area IL. Additionally, the light assembly 12 preferably activates at the same time as the interior map lights such that the illuminated area IL is illuminated when the interior map lights turn on. Preferably, the light bar light sources L2 of the light bar 26 and the projector light source L2 of the image projector 28 are configured to turn off along with the interior map lights after a predetermined time period. Alternatively, the light bar light sources L2 of the light bar 26 and the projector light source L2 of the image projector 28 of the light assembly 12 and the interior map lights turn off automatically in concert when the vehicle ignition is turned on.

Figure 5:
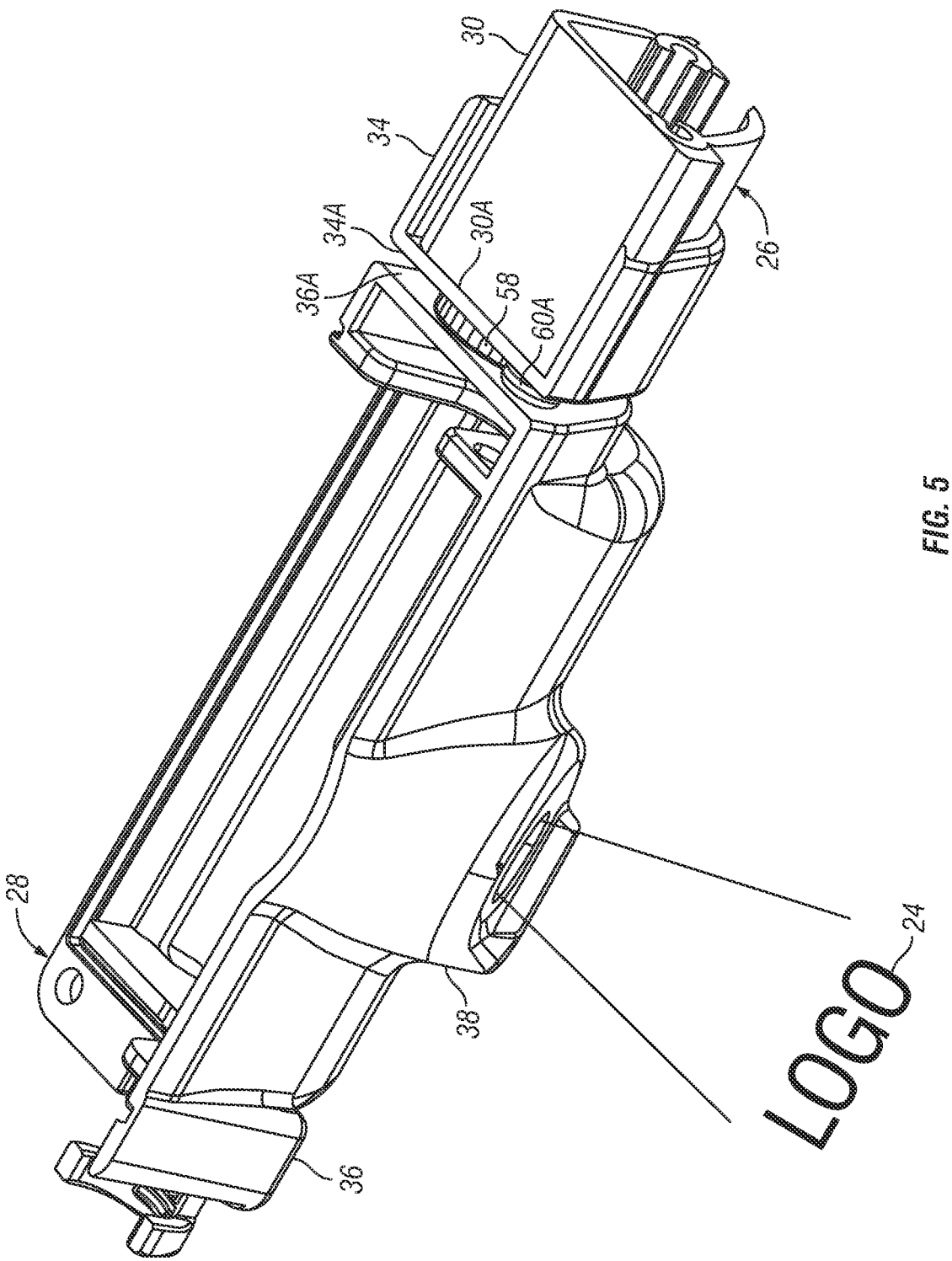
FIG. 5 is a perspective view of the projector connected to the end cap of FIG. 4 with a light bar received by the end cap.

As shown in FIGS. 1-3, the light bar 26 of the light assembly 12 is configured to be connected to the vehicle 10. The projector 28 is rotatably connected to the light bar 26. The projector 28 is rotatable relative to the light bar 26, as shown in FIGS. 5, 11 and 12. The projector 28 is rotatable to a position relative to the light bar 26 suitable for the vehicle 10 to which the light assembly 12 is installed, thereby allowing the light assembly 12 to be installed to a variety of vehicle makes and models.

Figure 6:
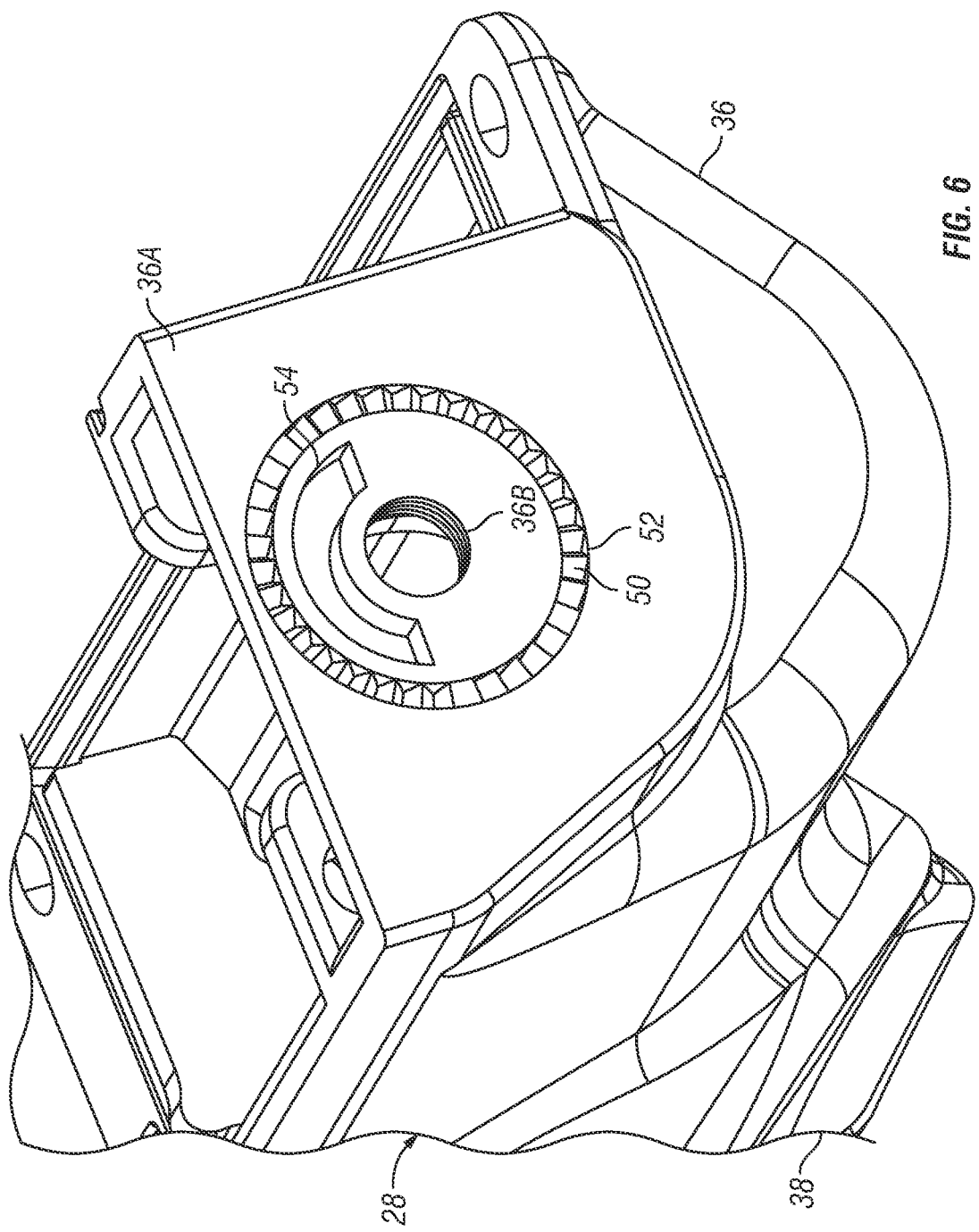
FIG. 6 is a perspective view of the projector of FIG. 4.

As shown in FIGS. 6 and 9, an axial face 36A of the projector housing 36 includes a fastener opening 36B configured to receive the fastener 48 to secure the end cap 34 to the projector 28. The axial face 36A faces a rearward direction R (FIG. 2) of the vehicle 10. A plurality of teeth 50 extend axially from a groove 52 disposed in the axial face 36A of the housing 36 of the projector 28. The plurality of teeth 50 preferably extend substantially continuously along the circumferential groove 52, as shown in FIG. 6. The fastener opening 36B is preferably disposed radially inward of the plurality of teeth 50.

An elongated opening 54 is disposed in the axial face 36A of the projector housing 36 of the projector 28. The elongated opening 54 is configured to receive electrical wiring 56 from the electric control module 44, as shown in FIG. 9. The elongated opening 54 preferably has an arcuate shape to accommodate rotation of the projector 28. The elongated opening 54 is shown disposed between the fastener opening 36B and the plurality of teeth 50, as shown in FIG. 6. Alternatively, the elongated opening 54 can be disposed radially outward of the plurality of teeth 50.

Figure 7:
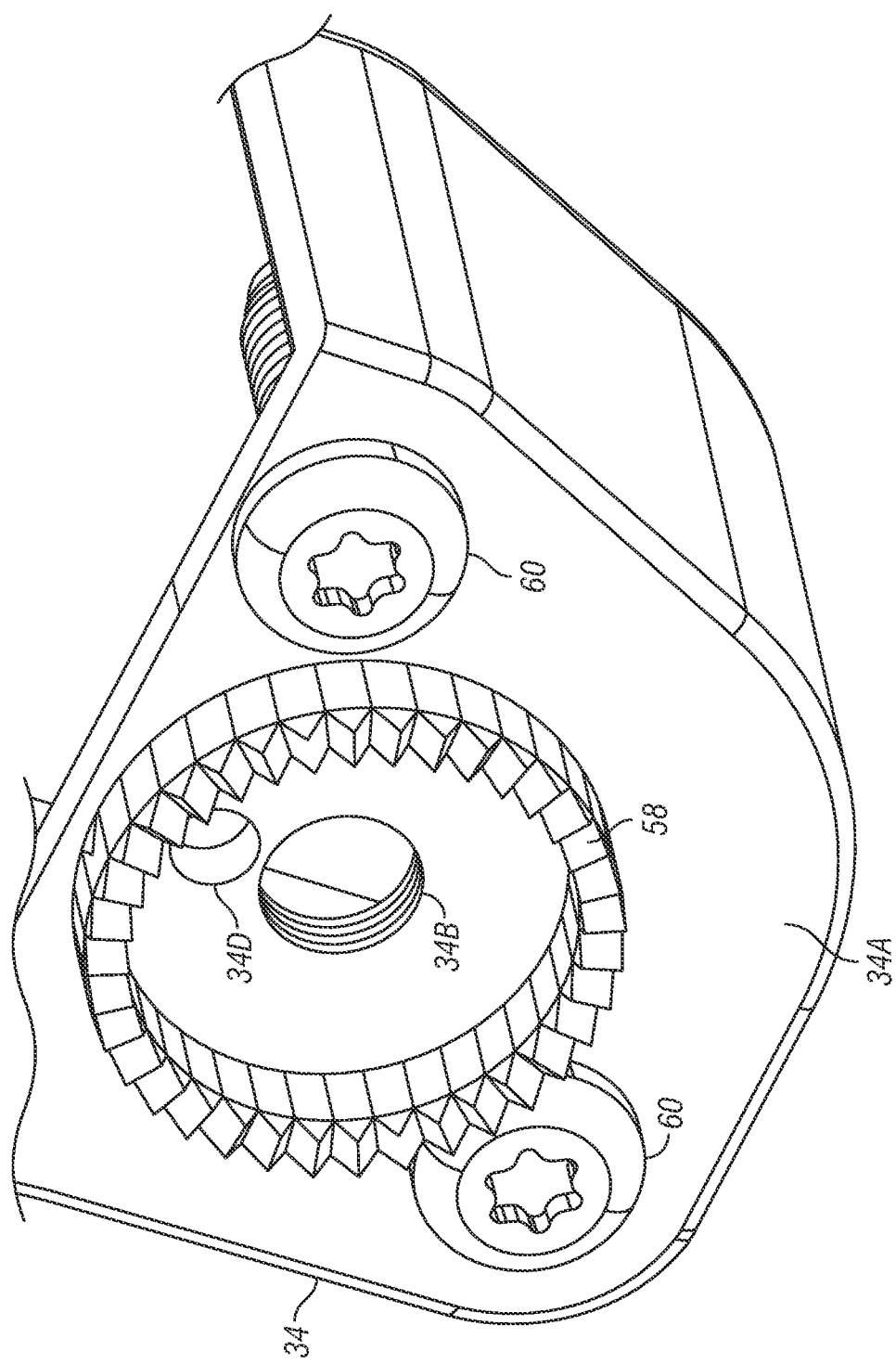
FIG. 7 is a perspective view of the end cap of FIG. 4.

As shown in FIGS. 7 and 9, an axial face 34A of the end cap 34 includes a first fastener opening 34B configured to receive the fastener 48 to secure the end cap 34 to the projector 28. The axial face 34A faces a forward direction F (FIG. 2) of the vehicle 10. A plurality of teeth 58 extend axially from the axial face 34A of the end cap 34. The plurality of teeth 58 preferably extend substantially continuously in a circumferential direction. The fastener opening 34B is preferably disposed radially inward of the plurality of the teeth 58.

Figure 8:
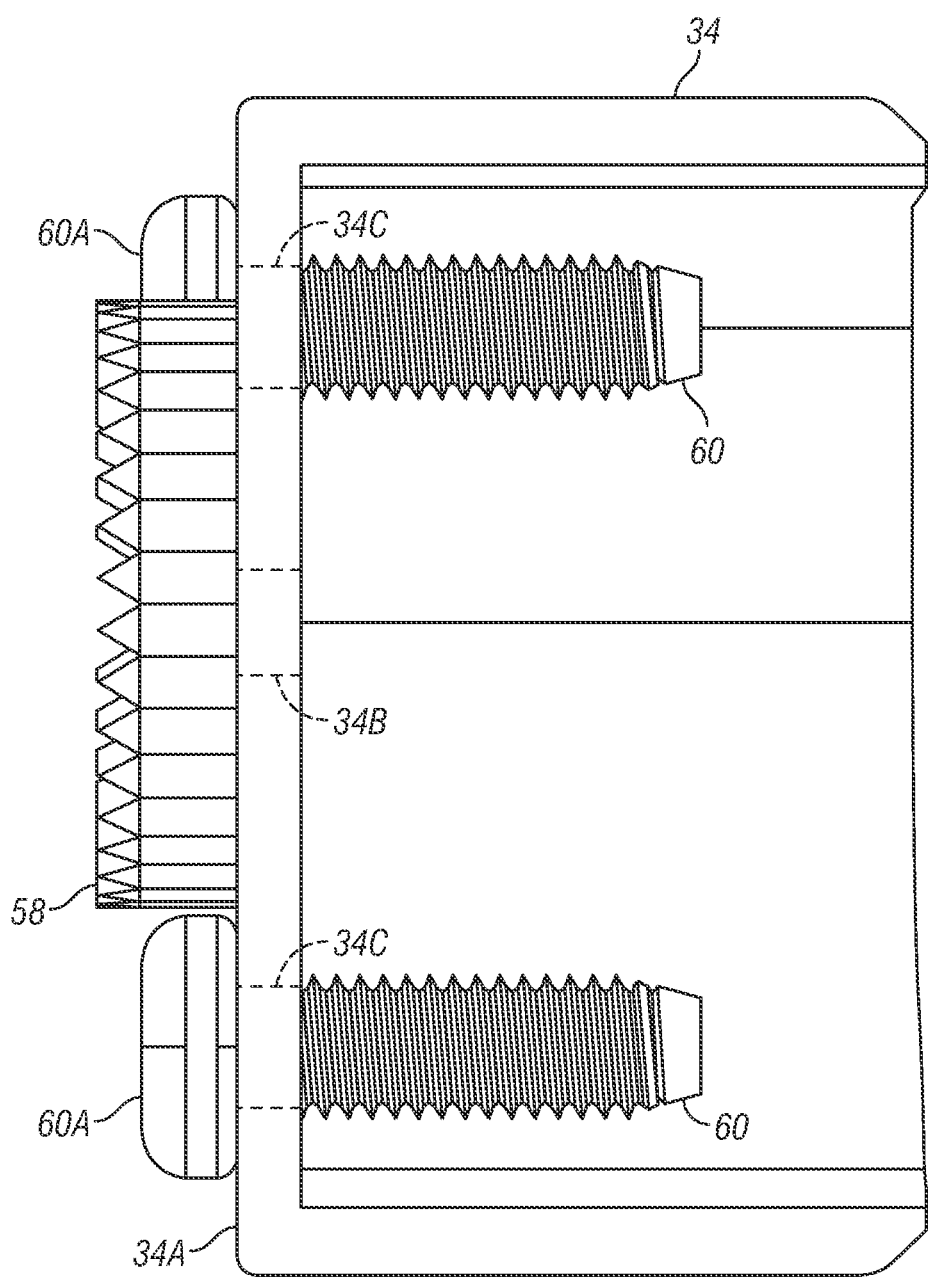
FIG. 8 is a top plan view of the end cap of FIG. 7.

At least one second opening 34C extends through the axial face 34A of the end cap 34, as shown in FIGS. 7-9. The at least one second opening 34C is configured to receive a fastener 60 to secure the end cap 34 to the fixed structure 30 of the light bar 26. Preferably, two second openings 34C are disposed in the axial face 34A of the end cap 34. The two second openings 34C are preferably diametrically opposed and disposed radially outward of the plurality of teeth 58.

A third opening 34D extends through the axial face 34C, as shown in FIGS. 7-9. The third opening 34D is disposed radially inward of the plurality of teeth 58. The third opening 34D is configured to receive the electrical wiring 56 from the electric control module 44.

As shown in FIGS. 9-12, the fasteners 60 secure the end cap 34 to the fixed structure 30 of the light bar 26. The fasteners 60 do not engage the housing 36 of the projector 28. The fastener 48 secures the projector 28 to the end cap 34 and to the fixed structure 30 of the light bar 26. The projector 28 is positioned at a desired mounting angle α, and the fastener 48 secures the projector 28 to the end cap 34 at the desired mounting angle α. The fastener 48 engages the teeth 50 of the projector 28 with the teeth 58 of the end cap 34 to substantially prevent rotation of the projector 28 relative to the end cap 34. As shown in FIG. 9, heads 60A of the fasteners 60 are spaced from the axial face 36A of the housing 36 of the projector 36 by a first distance D1 in the longitudinal direction of the vehicle 10 when the fastener 48 is disposed in a first position. The first position of the fastener 48 engages the teeth 50 of the projector with the teeth 58 of the end cap 28 to substantially prevent rotation of the projector 28 relative to the end cap 34 of the light bar 26.

Figure 10:
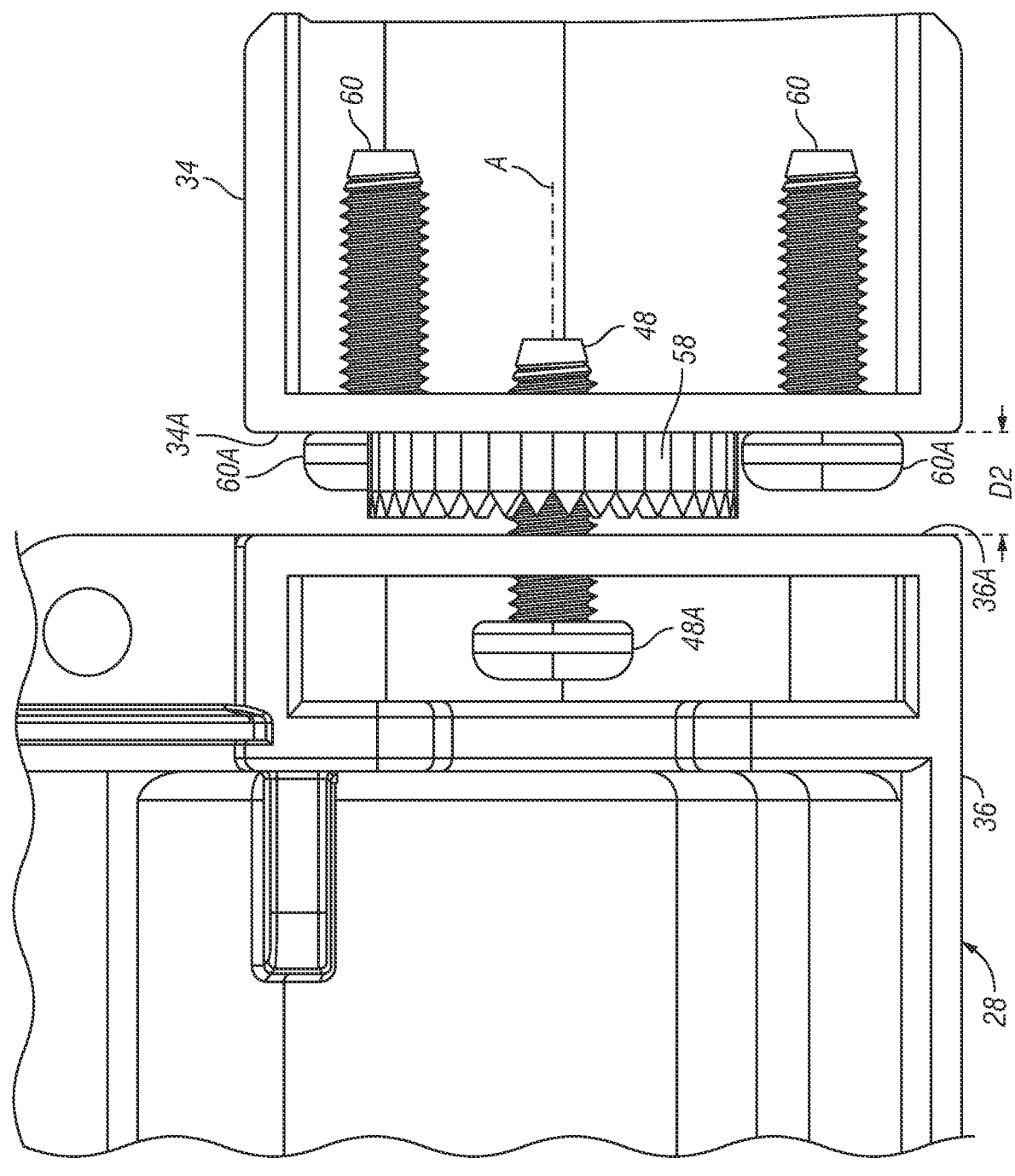
FIG. 10 is a top plan view of the projector connected to the end cap of FIG. 9 with the projector disposed in a second position.

The fastener 48 is movable between the first position, as shown in FIG. 9, and a second position, as shown in FIG. 10, in a longitudinal direction of the vehicle. Moving the fastener 48 to the second position, as shown in FIG. 10, allows the projector 28 to rotate relative to the end cap 34 of the light bar 26. As shown in FIG. 10, the heads 60A of the fasteners 60 are spaced from the axial face 36A of the housing 36 of the projector 28 by a second distance D2 in the longitudinal direction of the vehicle 10 when the fastener 48 is disposed in the second position. The second distance D2 is larger than the first distance D1. The projector 28 is rotatable about a longitudinal axis A of the fastener 48, as shown in FIGS. 10 and 12. When the fastener 48 is moved to the second position, the projector 28 is configured to be axially movable relative to the end cap 34 of the light bar 26 from a first position shown in FIG. 9 to a second position shown in FIG. 10. As shown in FIG. 9, the teeth 50 of the projector 28 are engaged with the teeth 58 of the end cap 34 to substantially prevent rotation of the projector 28 relative to the end cap 34 of the light bar 26 when the projector 28 is in the first position. When the projector 28 is moved to the second position, as shown in FIG. 10, the teeth 50 of the projector 28 are disengaged from the teeth 58 of the end cap 34 to facilitate rotation of the projector 28 relative to the end cap 34 of the light bar 26.

When the fastener 48 is moved to the second position, as shown in FIG. 10, the projector is moved axially from the first position to the second position. The projector 28 can then be rotated about the longitudinal axis A of the fastener 48 to a desired mounting angle α. The fastener 48 is then moved to the first position, as shown in FIG. 9, to engage the teeth 50 of the projector 28 with the teeth 58 of the end cap 28 of the light bar 26 to substantially prevent rotation of the projector 28 relative to the end cap 28 of the light bar 26.

As shown in FIG. 6, the elongated slot 54 in the axial end face 36A of the projector housing 36 receives the electrical wiring 56. The opening 34D in the axial face 34A of the end cap 34 receives the electrical wiring 56 and is aligned with the elongated slot 54 in the projector 28 to pass the electrical wiring 56 between the projector 28 and the light bar 26. The elongated slot 54 in the projector housing 36 accommodates the electrical wiring 56 when the projector 28 is rotated relative to the end cap 34 of the light bar 26 to prevent damage to the electrical wiring 56.

The projector 28 is rotatable relative to the end cap 34 of the light bar 26 to provide a light assembly 12 configured to be mounted to a variety of vehicle makes and models. The projector 28 can be secured to the end cap 34 of the light bar 26 with a mounting angle α suitable for the specific make and model of the vehicle to which the light assembly 12 is to be installed. The projector 28 is rotated relative to the light bar 26 to obtain the desired mounting angle α, and then secured to the light bar 26, such that the projector 28 can be secured to the light bar 26 over a range of mounting angles α.

Figure 13:
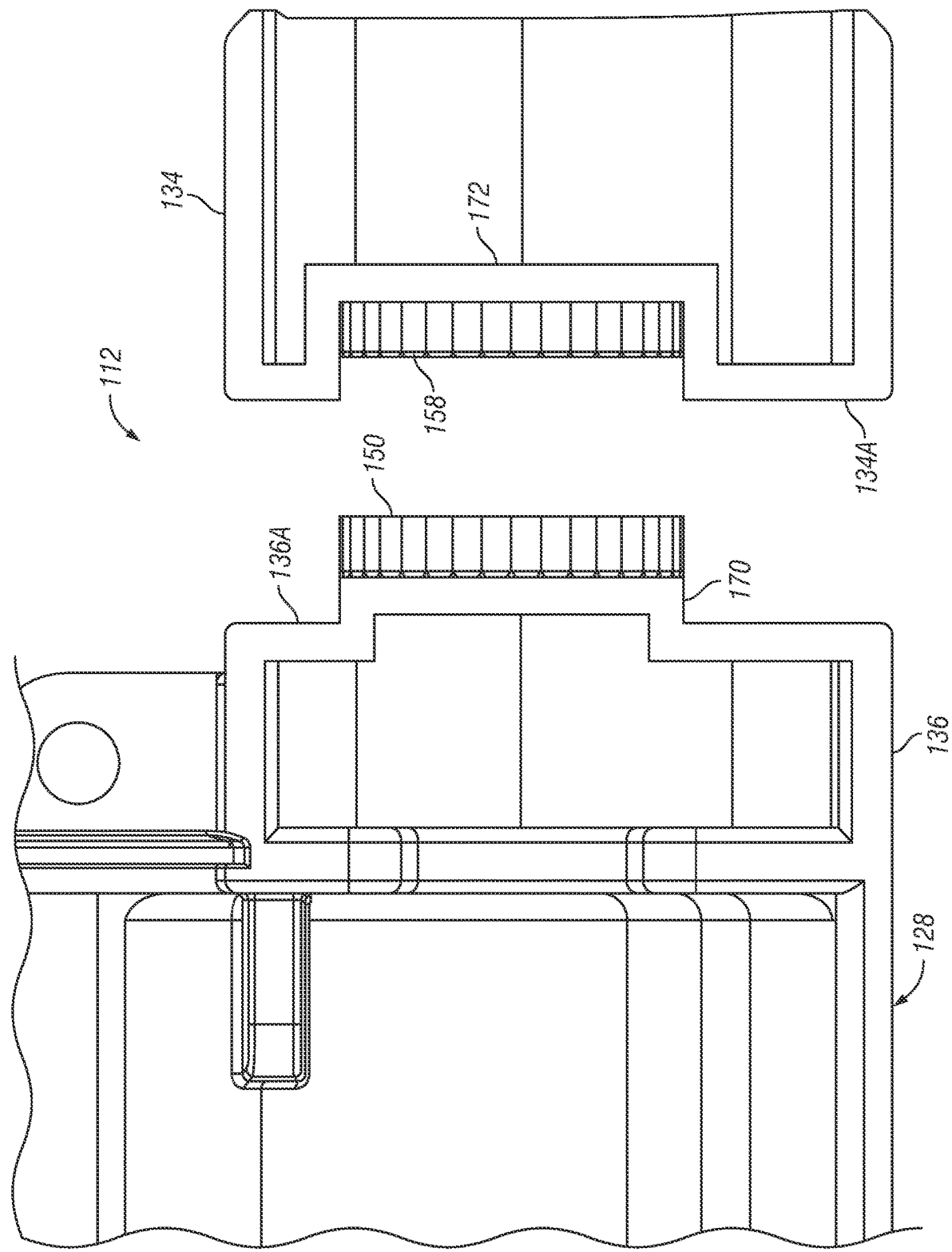
FIG. 13 is a top plan view of a projector disengaged from an end cap in accordance with another exemplary embodiment.
Figure 14:
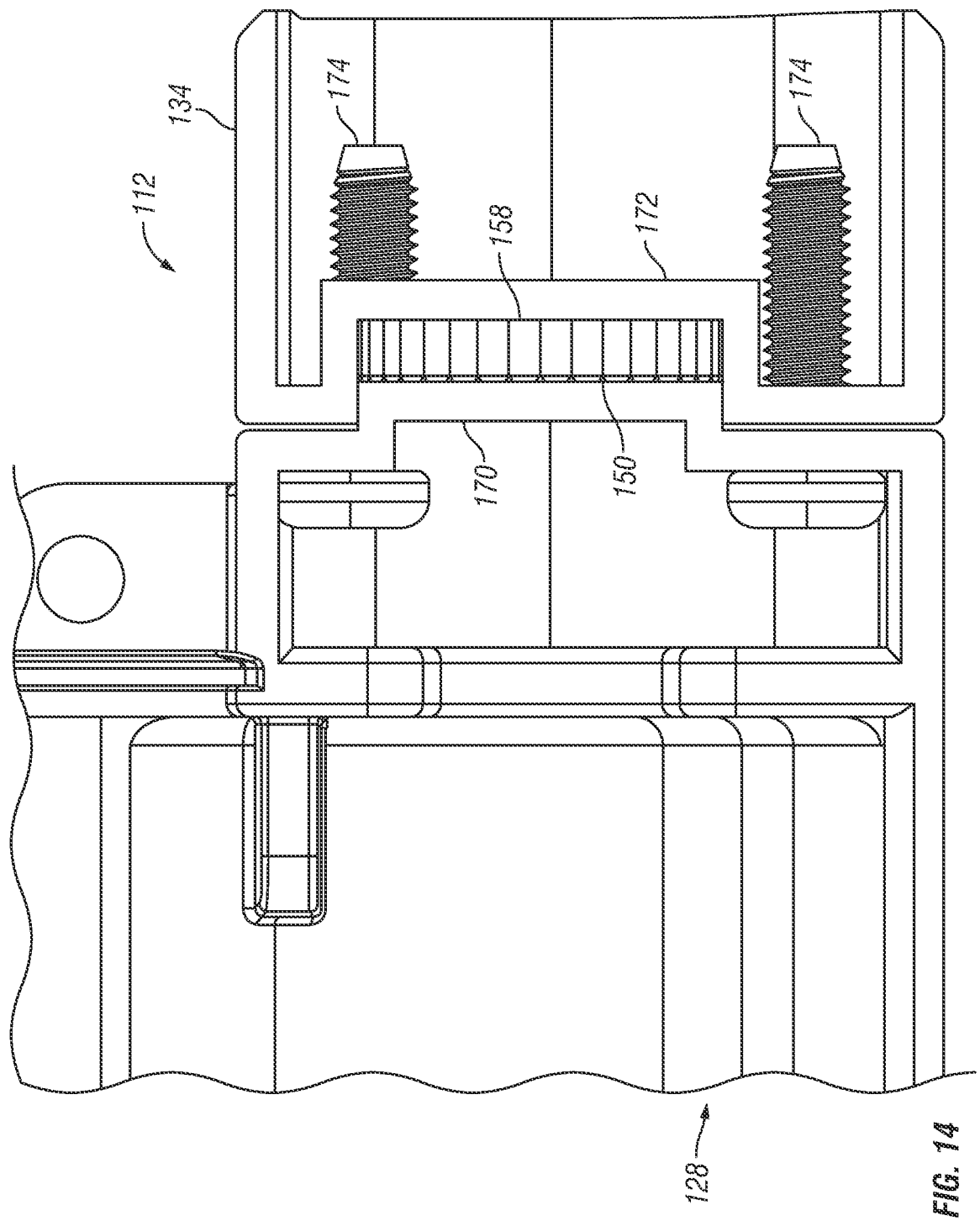
FIG. 14 is a top plan view of the projector connected to the end cap of FIG. 13.
Figure 15:
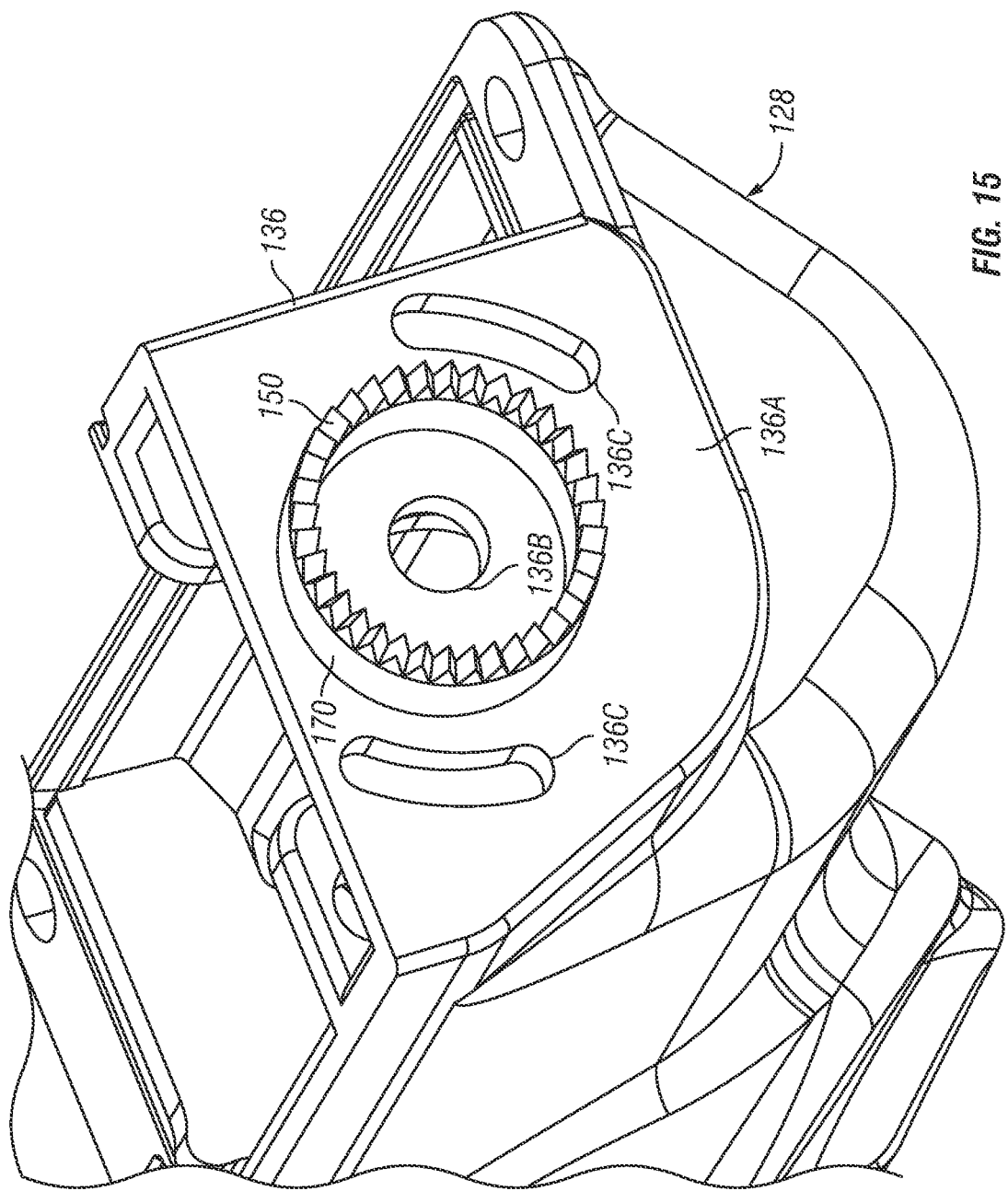
FIG. 15 is a perspective view of the projector of FIG. 13.

As shown in FIGS. 13-15, a vehicle light assembly 112 in accordance with another illustrated exemplary embodiment of the present invention is substantially similar to the vehicle light assembly 12 of the exemplary embodiment illustrated in FIGS. 1 to 12 except for the differences described below. Similar parts are identified with similar reference numerals, except increased by 100 (i.e., 1xx, accordingly).

The plurality of teeth 150 of the projector 128 are disposed on a projection 170 extending outwardly from the axial face 136A of the projector housing 136, as shown in FIGS. 13-15. The projection 170 extends outwardly from the axial face 136A of the projector housing 136 in a longitudinal direction of the vehicle.

The plurality of teeth 158 of the end cap 134 are disposed in a recess 172, as shown in FIGS. 13 and 14. The recess 172 extends inwardly from an axial face 134A of the end cap 134. The recess 172 extends inwardly from the axial face 134A in the longitudinal direction of the vehicle.

Fasteners 174 secure the projector 128 to the end cap 134, as shown in FIG. 14. A laterally extending wall disposed in a vehicle forward direction of the axial face 136A of the projector 128 is configured to provide access to the fasteners 174 such that the fasteners 174 can be inserted and removed without obstruction or interference. The projector 128 is rotated to a desired orientation relative to the end cap 134, and the fasteners 174 are tightened to engage the plurality of teeth 150 of the projector 128 with the plurality of teeth 158 of the end cap 134. The opening 136B in the axial face 134A of the projector housing 136 receives the electrical wiring 56 (FIGS. 1 and 9). The central fastener 48 of the embodiment illustrated in FIGS. 1-12 is replaced with the plurality of fasteners 174 shown in FIGS. 13-15. The fasteners 174 secure the projector 128 to the end cap 134 and to the light bar 26 (FIGS. 5 and 12).

The fastener slots 136C in the axial face 136A of the housing 136 of the projector 128 are elongated to facilitate rotation of the projector 128 relative to the end cap 134. The elongated fastener slots 136C are disposed outwardly of the plurality of teeth 150.

When the desired mounting angle α is obtained, the fasteners 174 can be inserted through the elongated slots 136C in the projector housing 136 and into the corresponding fastener openings in the end cap 134 and the fixed structure 30 (FIG. 5) to secure the projector to the end cap 134 of the light bar. The plurality of teeth 150 of the projector 128 engage the plurality of teeth 158 of the end cap 134 to substantially prevent rotation of the projector 128 relative to the end cap 134 of the light bar. Similarly to the light assembly 12 of FIGS. 1-12, the fasteners 174 can be moved to a second position to rotate the projector 128 relative to the end cap 134 of orient the projector 128 at a different mounting angle α.

As shown in FIGS. 16-18, a vehicle light assembly 212 in accordance with another illustrated exemplary embodiment of the present invention is substantially similar to the vehicle light assembly 12 of the exemplary embodiment illustrated in FIGS. 1 to 12 except for the differences described below. Similar parts are identified with similar reference numerals, except increased by 200 (i.e., 2xx, accordingly).

A tooth, or lug, 280 extends outwardly from an axial face 236A of a housing 236 of the projector 228, as shown in FIG. 16. The lug 280 extends in a longitudinal direction of the vehicle from the axial face 236A of the projector housing 236.

A notch 282 is disposed in an axial face 230C of the fixed structure 230 of the light bar 226, as shown in FIG. 16. A seal 284 is configured to be seal the longitudinal end of the fixed structure 230. An opening 284A is disposed in the seal 284 to receive the electrical wiring 256.

Fastener openings 230D are disposed in the fixed structure 230, as shown in FIGS. 17 and 18. The fastener openings 230D are configured to receive fasteners 286 to secure the projector 228 to the fixed structure 230 of the light bar 226, as shown in FIG. 16.

As shown in FIG. 17, the notch 282A is disposed in a first location in the fixed structure 230. As shown in FIG. 18, the notch 282B is disposed in a second location in the fixed structure 230. The second location is different from the first location. The projector 228 is rotated relative to the fixed structure 230 until the lug 280 is received by the notch 282. The fasteners 286 secure the projector 228 to the light bar 226 to substantially prevent rotation of the projector 228 relative to the light bar 226. The light bar 226 is selected in which the notch 282 is disposed in a location in the fixed structure 230 providing the desired mounting angle α of the projector 228.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the light assembly. Accordingly, these terms, as utilized to describe the present invention should be interpreted relative to a vehicle equipped with the light assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A light assembly comprising:
a light bar configured to be connected to a vehicle;
an end cap connected to an end of the light bar, and
a projector rotatably connected to the end cap, the projector being rotatable relative to the end cap,
the projector being configured to be axially movable relative to the end cap between a first position and a second position, rotation of the projector relative to the end cap being prevented when the projector is in the first position, and the projector being rotatable relative to the end cap when the projector is in the second position.

2. The light assembly according to claim 1, wherein
a first fastener secures the end cap to the light bar, and
a second fastener secures the projector to the end cap.

3. The light assembly according to claim 2, wherein
the second fastener is movable between a first position and a second position,
the projector being prevented from axial and rotational movement relative to the end cap when the second fastener is in the first position, and
the projector being axially moveable and rotatable relative to the end cap when the second fastener is in the second position.

4. The light assembly according to claim 3, wherein
the projector is rotatable about a longitudinal axis of the second fastener.

5. The light assembly according to claim 1, wherein
a first plurality of teeth are disposed on an axial end face of the projector; and
a second plurality of teeth are disposed on an axial end face of the end cap.

6. The light assembly according to claim 5, wherein
the first and second plurality of teeth are engaged when the projector is in the first position to prevent rotation of the projector relative to the end cap, and
the first and second plurality of teeth are disengaged when the projector is in the second position to allow rotation of the projector relative to the end cap.

7. The light assembly according to claim 6, wherein
a fastener secures the projector to the end cap, the fastener being movable between a first position and a second position,
axial and rotational movement of the projector relative to the end cap are prevented when the fastener is in the first position, and
the projector is axially and rotationally moveable relative to the end cap when the fastener is in the second position.

8. The light assembly according to claim 7, wherein
the projector is rotatable about a longitudinal axis of the fastener.

9. The light assembly according to claim 1, wherein
rotation of the projector changes an angle at which the light source emits light from the projector.

10. A light assembly comprising:
a light bar configured to be connected to a vehicle;
an end cap connected to an end of the light bar, and
a projector rotatably connected to the end cap, the projector being rotatable relative to the end cap,
a wiring opening disposed in the end cap; and
an elongated slot disposed in the projector, the elongated slot being aligned with the wiring opening to pass electrical wiring from the light bar through the end cap to the projector, the elongated slot being configured to accommodate the electrical wiring during rotational movement of the projector relative to the end cap.

11. The light assembly according to claim 10, wherein
the elongated slot is curved.

12. The light assembly according to claim 10, wherein
a first fastener opening in the projector and a second fastener opening in the end cap, the first and second fastener openings receiving a fastener that secures the projector to the end cap.

13. The light assembly according to claim 12, wherein
the elongated slot in the projector is disposed radially outward of the first fastener opening.

14. The light assembly according to claim 13, wherein
the wiring opening in the end cap is disposed radially outward of the second fastener opening.

15. The light assembly according to claim 14, wherein
a first plurality of teeth are disposed on an axial end face of the projector; and
a second plurality of teeth are disposed on an axial end face of the end cap.

16. The light assembly according to claim 15, wherein
the elongated slot in the projector is disposed radially inward of the first plurality of teeth.

17. The light assembly according to claim 16, wherein
the wiring opening in the end cap is disposed radially inward of the second plurality of teeth.

18. The light assembly according to claim 15, wherein
the first plurality of teeth are circumferentially arranged on the axial end face of the projector, the elongated slot being disposed within an area defined by the first plurality of teeth.

19. The light assembly according to claim 15, wherein
the second plurality of teeth are circumferentially arranged on the axial end face of the end cap, the wiring opening being disposed within an area defined by the second plurality of teeth.

* * * * *